C. E. WHITE.
TRACTOR COUPLING DEVICE.
APPLICATION FILED JULY 31, 1916.

1,267,027.

Patented May 21, 1918.
2 SHEETS—SHEET 1.

INVENTOR
CHARLES E. WHITE
BY Paul & Paul
ATTORNEYS

WITNESSES

UNITED STATES PATENT OFFICE.

CHARLES E. WHITE, OF RULETON, KANSAS, ASSIGNOR TO BULL TRACTOR COMPANY, OF MINNEAPOLIS, MINNESOTA, A CORPORATION.

TRACTOR-COUPLING DEVICE.

1,267,027.

Specification of Letters Patent.   Patented May 21, 1918.

Application filed July 31, 1916. Serial No. 112,394.

*To all whom it may concern:*

Be it known that I, CHARLES E. WHITE, citizen of the United States, resident of Ruleton, county of Sherman, State of Kansas, have invented certain Improvements in Tractor-Coupling Devices, of which the following is a specification.

The object of this invention is to provide means by which a tractor or traction engine can be connected and coupled to a grain harvester, or other implement designed to be pushed and moved ahead of said tractor or engine, and at the same time permitting said implement to be guided by said tractor or engine and to be quickly turned for the purpose of making a corner while in operation.

The invention consists generally in the constructions and combinations hereinafter described and particularly pointed out in the claims.

In the accompanying drawings forming part of this specification,

Figure 1:
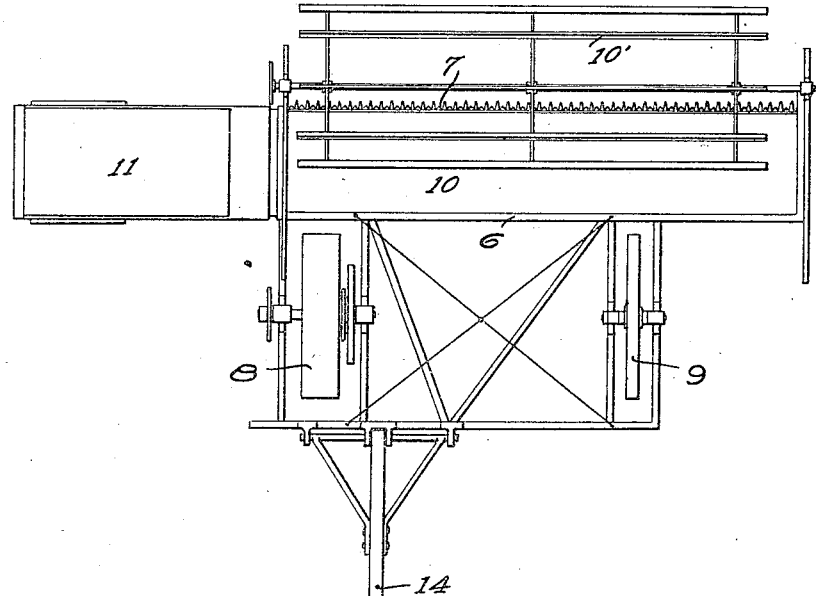
Figure 1 is a plan view of a tractor or traction engine and a grain harvester of the type known as a "header," the parts being arranged and connected in accordance with my invention.
Figure 1:
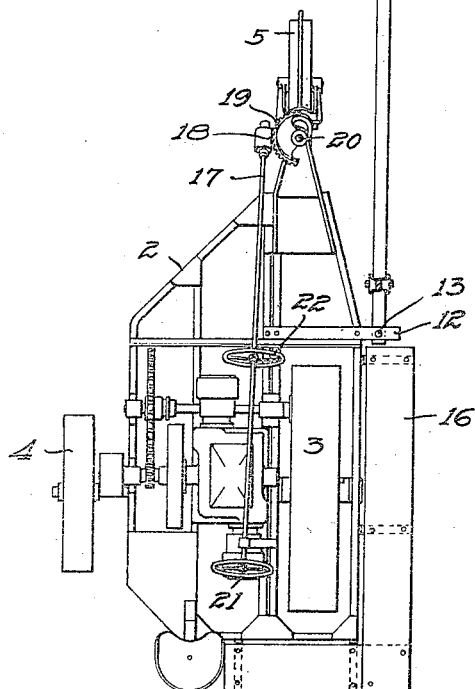
Figure 2:
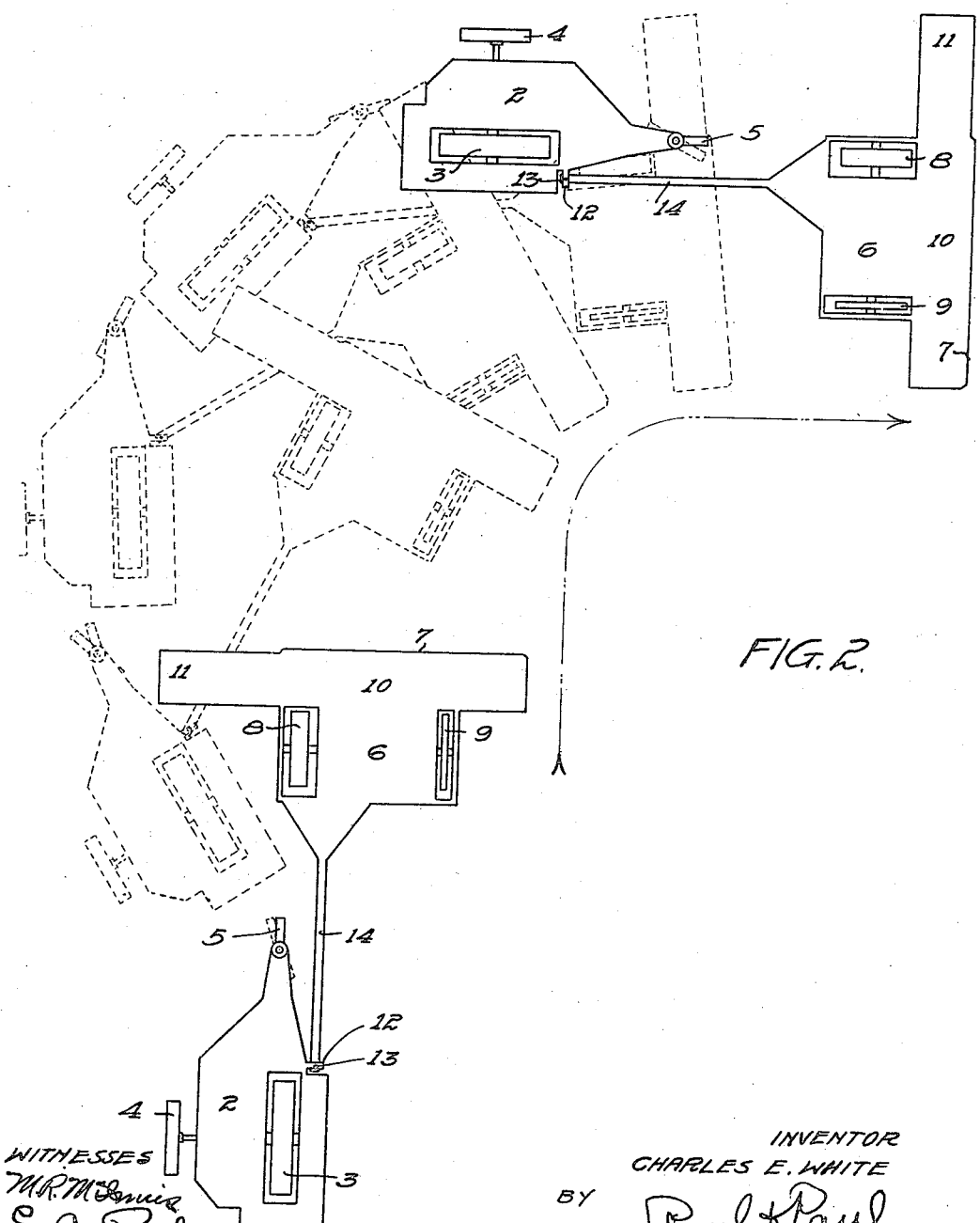
Fig. 2 is a diagram illustrating the operation of the device when turning or making a square corner in the operation of the machine.

In the drawing, 2 represents the frame of a traction engine or tractor, which may be of any preferred construction, although I prefer to employ a three-wheeled tractor, these wheels being a main driving or traction wheel 3, an idle supporting wheel 4, and a single steering wheel 5 arranged directly in front of the traction wheel 3. This type of tractor is well known under the name of the "Bull tractor" and the general design thereof is substantially illustrated in the patent issued to D. Maurice Hartsough, No. 1,128,246, dated February 9th, 1915.

6 represents a grain harvesting machine, of the type generally designed a "header," preferably provided with a forwardly arranged cutter 7, a bull or driving wheel 8, a supporting wheel 9, a belt carrier 10, a reel 10' and an elevator 11. Projecting from the side of the frame 2 of the tractor, preferably between the rear and forward wheels, is a suitable bracket 12. Connected to this bracket by an upright pivot 13 is a pole 14 which extends from the bracket 12 forwardly alongside the frame 2 of the tractor or traction engine, and has its forward end rigidly connected to the frame of the header or other implement that is to be propelled by the tractor.

The tractor is guided in the usual way by means of the steering wheel 5, and the header or other implement is pushed forward by the tractor.

The pivotal point 13 is preferably arranged at a distance from the side of the frame of the tractor slightly greater than the diameter of the pole 14, so that when said pole is standing parallel with the line of movement of the tractor it is at all points a short distance away from said frame, and the pole can have a slight swinging motion in one direction on its pivot before it comes in contact with the frame, and a free swinging motion in the other direction.

The point of connection between the pole and tractor is sufficiently back from the front end of the tractor that the resistance offered by the tractor in pushing the agricultural implement in making a turn is greater than the resistance offered by the header or agricultural implement with the result that the implement may be turned, pushed and guided by the tractor through the instrumentality of the pole.

I have also shown the tractor frame provided with a running board 16 supported as here shown at the right side of the frame opposite the traction wheel. This running board enables the operator when the machine is in use to walk around by the side of the tractor without stepping off from the machine.

17 represents an inclined steering rod which is provided with a worm 18 at its lower end engaging a gear 19 on the top of the steering post 20. The rod 17 extends back to the rear of the tractor and is usually provided with a hand-wheel 21. As it will be convenient frequently for the operator to ride standing on the running board 16, it is found desirable to provide the rod 17 with an extra hand-wheel 22, located in front of the motor and in position to be grasped and worked by an operator standing on the forward end of said running board.

The forward end of the pole 14 is rigidly attached to the implement to be pushed, at a point where the rearward thrust of the machine will be practically balanced on the opposite sides of the pole. In a header of the type illustrated this point of attachment will be quite close to the right of the bull or driving wheel as illustrated in Fig. 1 of the drawings. This arrangement brings the bull wheel of the header, the steering wheel and the bull wheel of the tractor substantially in line with one another. By turning the steering wheel 5 slightly toward the pole 14, the header, or other implement being moved by the tractor, can be guided slightly in the opposite direction, or toward the left, thus causing the header, if that is the implement being moved, to veer slightly away from the uncut grain. When it is desired to turn a corner the tractor is turned sharply to the left or away from the pole 14, and by that means the header or other implement will be swung around so that the pole 14 will stand at a considerable angle to the frame of the tractor, and a further movement of the tractor, guided toward the new line of movement, will bring the parts into the original position of travel. By this means a square corner can readily and quickly be turned in cutting grain or performing other farming operations.

One of the special advantages obtained with this construction is due to the pivoting of the pole to the bracket located at a point between the front and rear wheels. It is not essential that the front wheel be the steering wheel, as the device could be employed with the steering wheel behind and the tractor wheel in front, but I prefer the construction shown.

I do not limit myself to the details of construction shown and described, as the same may be varied in many particulars without departing from my invention.

I claim as my invention:

1. The combination, with a tractor having a suitable frame and forward and rear wheels, of a pole pivotally connected to said frame between said forward and rear wheels to swing horizontally and having its forward end extending beyond the front end of the tractor with an agricultural implement secured to the forward end of said pole, the point of connection between the pole and tractor being sufficiently back of the front of the tractor that the resistance offered by the tractor is greater than that offered by the agricultural implement in turning and guiding the implement by the tractor through said pole.

2. The combination, with a tractor having a suitable frame and forward and rear wheels, of a bracket secured to said frame and projecting laterally therefrom at a point between said forward and rear wheels, a pole pivotally connected to said bracket to swing horizontally and having its forward end extending beyond the front end of the tractor, and an agricultural implement having its frame rigidly secured to the forward end of said pole, the point of connection between the pole and tractor being sufficiently back of the front of the tractor that the resistance offered by the tractor is greater than that offered by the agricultural implement in turning and guiding the implement by the tractor through said pole.

3. The combination, with a tractor having a suitable frame, a rear traction wheel and a forwardly arranged guide wheel pivotally supported upon said frame substantially in line with said traction wheel, of a pole pivotally connected to said frame between said steering and traction wheels to swing horizontally and having its forward end extending beyond the front end of the tractor, and an agricultural implement secured to the forward end of said pole, the point of connection between the pole and tractor being sufficiently back of the front of the tractor that the resistance offered by the tractor is greater than that offered by the agricultural implement in turning and guiding the implement by the tractor through said pole.

In witness whereof, I have hereunto set my hand this 19th day of July 1916.

CHARLES E. WHITE.

Witnesses:
H. E. HOGEBOOM,
J. L. DOUGLAS.

Copies of this patent may be obtained for five cents each, by addressing the "Commissioner of Patents, Washington, D. C."